United States Patent Office 2,745,831
Patented May 15, 1956

2,745,831
CHEMICAL COMPOUNDS

George H. Hitchings, Tuckahoe, and Peter Byrom Russell, Crestwood, N. Y., and Norman Whittaker, London, England, assignors to Burroughs Wellcome & Co. (U. S. A.) Inc., Tuckahoe, N. Y., a corporation of New York No Drawing. Application March 24, 1953, Serial No. 344,452

Claims priority, application Great Britain March 25, 1952

6 Claims. (Cl. 260—256.4)

This invention relates to a novel class of compounds and methods for their preparation. The members of this new series are dihydropyrimidines found of interest as inhibitors of growth of lactic acid bacteria and other microorganisms, and to be valuable as intermediates in the preparation of substances of pharmaceutical interest such as the 5-aryl-6-alkyl-2,4-diaminopyrimidines described in Patent No. 2,576,939. The new derivatives are 5-arylpyrimidines partially saturated at two positions of the pyrimidine ring. This saturation generally occurs at adjacent carbon atoms but this and the position of saturation may vary in individual cases. The new substances may be defined by the following formulae in which the two hydrogen atoms are probably located in the 5 and 6 positions of the dihydropyrimidine. The tautomeric forms of the compounds are shown in Formulae I$a$ and I$b$.

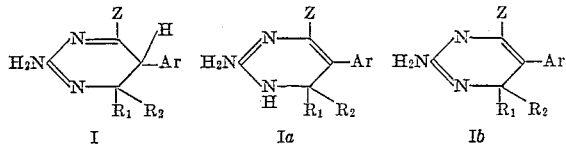

wherein Ar is an aryl group, $R_1$, $R_2$ and Z have the values assigned below, and Z is selected from the class consisting of hydroxyl and amino radicals.

The synthesis of these new compounds can be carried out in a systematic manner by the reaction of a β-substituted-α-arylacrylonitrile (II) with guanidine (III). They may also, and sometimes preferentially, be prepared in one stage by the reaction of an arylacetonitrile, guanidine and a carbonyl reagent of the class of aldehydes and ketones.

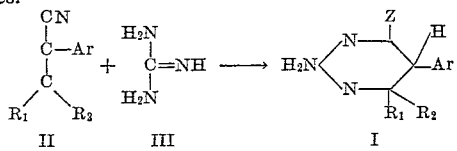

wherein $R_1$ and $R_2$ are selected from the class consisting of hydrogen and aryl and alkyl radicals, and together constitute bifunctional polymethylene radicals containing 5 to 8 carbon atoms, and Z is selected from the class consisting of hydroxyl and amino radicals. Although the 2,4-diamino-dihydropyrimidine would be the expected primary product, it has been found in practice that ammonia is sometimes evolved spontaneously during the reaction, and the aminohydroxydihydropyrimidine is the first product isolated.

The following examples illustrate the ways in which this invention may be applied but the invention is not limited in scope to these specific examples.

EXAMPLE 1

*2-amino-4-hydroxy-5-p-chlorophenyl-6-ethyl-dihydropyrimidine*

α-p-Chlorophenyl-β-ethylacrylonitrile was prepared by condensation of p-chlorophenylacetonitrile and propionaldehyde in the presence of sodium ethoxide as described by Murray and Cloke (J. A. C. S. 58, 2014 (1936)) for the de-chloro compound. It formed a sticky resin which deposited crystals. The resin could be separated from the crystals by solution in ether. The crystals appeared to be a dimer or higher polymer. They melted at 145°.

The oily resin was not distilled.

The above oil (52 g.) was refluxed for 10 hours with a solution of guanidine (from 37.5 gm. dry hydrochloride) in 300 ml. dry alcohol. Ammonia was evolved during the refluxing. After cooling the ethanol was diluted with an equal volume of water and the alcohol water layer decanted from the oil. The oil on washing with ether crystallized (20.7 g.). After recrystallization from EtOH it melted at 270°.

EXAMPLE 2

*2-amino-4-hydroxy-5,6-diphenyl-dihydropyrimidine*

α-Phenylcinnamic nitrile (v. Walther, J. Pr. Chem. (II), 53, 454 (1900)), 10 g., was reacted with guanidine (from 4.75 gm. hydrochloride) in ethanol 50 ml. on the steam bath overnight. The solution which smelled of ammonia was diluted with about an equal volume of water and made acid with acetic acid; a small precipitate was filtered off. The solution was then neutralized with 2 N sodium hydroxide to give a crystalline precipitate. It formed prisms, M. P. 285–286° from aqueous ethanol.

EXAMPLE 3

*2,4-diamino-5-p-chlorophenyl-6,6-tetramethylene-5,6-dihydropyrimidine*

α-Cyclopentylidene-p-chlorophenyl acetonitrile was prepared by the condensation of cyclopentanone and p-chlorophenylacetonitrile in alcoholic sodium ethoxide. It boiled at 198–202/8 m. and formed crystals, M. P. 73–74° from petroleum ether or 78° from aqueous ethanol.

The above nitrile 5.8 gm. was refluxed with guanidine (from 4.75 g. hydrochloride) in ethanol (50 ml.) for 58 hours. The alcoholic solution was then distilled with water and allowed to stand. After 5 hours the separated crystals were filtered off (4.7 g.). After recrystallization from aqueous methanol the compound melts at 152°.

*2-amino-4-hydroxy-5-p-chlorophenyl-6,6-tetramethylene-5,6-dihydropyrimidine*

The above diamino compound (2 g.) was dissolved in 2 N hydrochloric acid and diluted to 25 ml. The solution was then refluxed for ½ hour and cooled. After making alkaline the solid was filtered and recrystallized from aqueous methanol, needles, M. P. 286°.

EXAMPLE 4

*2,4-diamino-5-p-chlorophenyl-6,6-pentamethylene dihydropyrimidine*

1 (*a*) p-Chlorophenylacetonitrile (62 g.) was added to a cold solution of sodium (9.2 g.) in absolute ethyl alcohol (200 ml.). Cyclohexanone (40 g.) was then added and the solution refluxed for 15 minutes, cooled, diluted with water and acidified (sulfuric acid). The oil was extracted with ether, the extract washed with water, then with dilute sodium carbonate solution, and dried over anhydrous sodium sulfate. After evaporating the ether, the residual oil was distilled to give cyclohexylidene-p-chlorophenylacetonitrile (I) (47 g.) as a pale yellow oil, B. P. 170°/3 mm.

(*b*) Cyclohexylidene-p-chlorophenylacetonitrile (I) (15 g.) was added to a solution of guanidine (prepared from the hydrochloride (7.5 g.) in absolute ethyl alcohol (100 ml.)) and refluxed for 2 hours. The cooled solution was diluted with water, then allowed to stand overnight, and the crystals which had separated were collected, washed with water and then with benzene. The dried solid (12.6 g.) was recrystallized from methanol to give colorless prisms (9.4 g.) of 2,4-diamino-5-p-chlorophenyl-6-spiropentamethylene-5,6-dihydropyrimidine which melted, with decomposition (evolving methanol and ammonia) at 157–159°.

2. A mixture of p-chlorophenylacetonitrile (8 g.) and cyclohexanone (5.2 g.) was added to a solution of guanidine (prepared from the hydrochloride (5 g.) in absolute ethyl alcohol (64 ml.), and the solution refluxed for 3 hours. After working up by the method of 1 (*b*), 2,4-diamino - 5 - p - chlorophenyl - 6 - spiro - pentamethylene-5,6-dihydropyrimidine (II) was obtained as colorless prisms (4.3 g.), M. P., with decomposition, 157–159°.

*2-amino-4-hydroxy-5-p-chlorophenyl-6.6-pentamethylene-5,6-dihydropyrimidine (III)*

2,4 - diamino - 5 - p - chlorophenyl - 6 - spiropentamethylene-5,6-dihydropyrimidine (2.1 g.) and N/5 hydrochloric acid (100 ml.) were heated under reflux for 15 minutes, then made alkaline with sodium hydroxide. The precipitated solid (1.9 g.) was recrystallized from methanol to give colorless prisms (1.6 g.), M. P. 307° (decomp.), of III.

The following additional compounds falling within the invention are prepared by methods similar to the above.

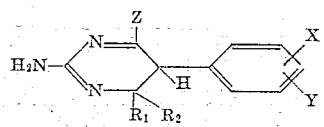

| Z | X | Y | $R_1$ | $R_2$ | Melting Point (dec.) |
|---|---|---|---|---|---|
| OH | 3-Cl | H | $C_2H_5$ | H | 229° |
| OH | 3-Cl | 4-Cl | $C_2H_5$ | H | 242° |
| $NH_2$ | 3-Cl | 4-Cl | $-(CH_2)_5-$ | -- | 167° |
| $NH_2$ | H | 4-Cl | $-(CH_2)_7-$ | -- | 182° |
| OH | 3-Cl | 4-Cl | $-(CH_2)_5-$ | -- | 317° |
| $NH_2$ | H | H | $-(CH_2)_5-$ | -- | 135° |
| OH | H | H | $-(CH_2)_5-$ | -- | 307° |

Compounds of the type mentioned above may be conveniently dehydrogenated to produce derivatives of high antimalarial potency, such as described in the aforementioned patent. Two methods for this dehydrogenation of the dihydro precursor are (1) heating with sulfur, and (2) combined dehydrogenation and replacement of the 4-hydroxyl group by mercapto by heating with phosphorus pentasulfide.

The conversion of 2-amino-4-hydroxy-5-p-chlorophenyl-6-ethylpyrimidine to the 2,4-diamino derivatives may be carried out in either of two ways, via the 2-acetamido-4-chloro derivative or via the 2-amino-4-mercapto pyrimidine as described in U. S. application Serial No. 639,258. The following are illustrative.

*2-amino-4-mercapto-5-p-chlorophenyl-6-ethylpyrimidine*

2 - amino - 4 - hydroxy - 5 - p-chlorophenyl - 6 - ethyl-5,6-dihydropyrimidine (10 g.) was mixed with phosphorus pentasulfide (25 g.) and tetrahydronaphthalene (70 ml.). The mixture was heated at 170–175° for 2 hours. After cooling the mixture was diluted with petroleum ether and filtered. The solid was dissolved in 200 ml. of water containing 50 ml. of concentrated ammonium hydroxide. After treating the solution with charcoal and filtering, the aminomercaptopyrimidine was precipitated by adding an excess of glacial acetic acid. It was recrystallized from benzene forming pale yellow prisms (5.1 g.) which melt at 231°.

The same substance was obtained by treatment of 2-amino-4-hydroxy-5-p-chlorophenyl-6-ethylpyrimidine with phosphorus pentasulfide, essentially as described above.

When the reaction was carried out at 190° rather than 170–175° the main product was 2,4-dimercapto-5-p-chlorophenyl-6-ethylpyrimidine. Yellow prisms (from benzene) melting at 317°.

*2-amino-4-hydroxy-5-(3',4'-dichlorophenyl)-6-ethylpyrimidine*

2 - amino - 4 - hydroxy - 5 - (3',4' - dichlorophenyl) - 6-ethyl-5,6-dihydropyrimidine (9 g.) was heated with sulfur (20 g.) at 170° for 3 hours. After cooling the mixture was extracted with carbon disulfide to remove the excess sulfur. The residue was dissolved in dilute sodium hydroxide and the solution treated with charcoal, filtered and precipitated with acetic acid. The crude amino-hydroxypyrimidine was boiled with acetic anhydride to convert it to the acetamido derivative which after recrystallization from aqueous ethanol melted at 261° (4.0 g.).

We claim:

1. Compounds selected from the class consisting of those of the formula

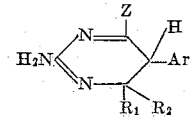

wherein Ar is an aryl group, $R_1$ and $R_2$ are selected from the class consisting of hydrogen, lower alkyl radicals, and when joined, form a spiro ring containing from five to seven carbon atoms, and Z is selected from the class consisting of hydroxyl and amino radicals, the tautomeric forms of such compounds and their non-toxic salts.

2. 2-amino-4-hydroxy-5-p-chlorophenyl-6-ethyl-dihydropyrimidine.

3. 2,4 - diamino - 5 - (3',4' - dichlorophenyl) - 6,6 - pentamethylene dihydropyrimidine.

4. 2,4 - diamino - 5 - p - chlorophenyl - 6,6 - tetramethylene-5,6-dihydropyrimidine.

5. 2,4 - diamino - 5 - p - chlorophenyl - 6,6 - pentamethylene dihydropyrimidine.

6. The method of preparing compounds of the formula

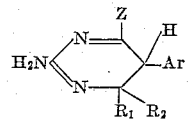

wherein Ar is an aryl group, $R_1$ and $R_2$ are selected from the class consisting of hydrogen, lower alkyl radicals, and when joined, form a spiro ring containing from five to seven carbon atoms, and Z is selected from the class consisting of hydroxyl and amino radicals, which comprises reacting an unsaturated β-substituted-α-arylacrylonitrile of the formula

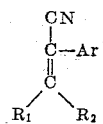

with guanidine.

References Cited in the file of this patent
UNITED STATES PATENTS 2,624,731   Hitchings et al. _____ Jan. 6, 1953

OTHER REFERENCES

Richter: Textbook of Org. Chem. (1938 ed.), page 9, John Wiley and Sons, New York, N. Y.

Falco et al.: Brit. J. Pharmacol. and Chemotherapy 6, 191 (1951).